2,846,468

RECOVERY OF TEREPHTHALIC ACID

Owen York, Jr., Bloomington, Ill., assignor to Hercules Powder Company, Wilmington, Del., a corporation of Delaware No Drawing. Application March 8, 1957
Serial No. 644,728

4 Claims. (Cl. 260—525)

The present invention relates to a process for the recovery of terephthalic acid from aqueous solutions of its alkali metal salts.

There have recently been proposed methods for the manufacture of terephthalic acid which are characterized by heating a monovalent salt of a benzene carboxylic acid other than terephthalic acid in an atmosphere free from oxygen to a relatively high temperature whereby the corresponding monovalent salt of terephthalic acid is produced in a high yield. A description of these prior art methods may be found in Belgian Patent 522,829 and Belgian Patent 524,035.

A specific embodiment of the prior art methods employs an alkali metal salt of a benzene carboxylic acid other than terephthalic acid as the starting material. When this starting material is heated in an atmosphere free from oxygen, preferably under pressure and preferably in the presence of a catalyst, there is obtained a crude reaction product containing a high proportion of dialkali metal terephthalate together with unidentified impurities, residual catalyst (if a catalyst is used), and unreacted starting material. The material, of course, that is ultimately desired is not the dialkali metal salt of terephthalic acid but rather terephthalic acid itself. Therefore, it has been proposed in the prior art to recover terephthalic acid by dissolving in water the dialkali metal salt of terephthalic acid contained in the reaction product and then precipitating terephthalic acid from the resulting solution by the addition of a mineral acid. By this method terephthalic acid can be precipitated substantially quantitatively.

While the above recovery process produces very attractive yields of terephthalic acid, it has the disadvantage that the acidification of the aqueous solution of the reaction products with a mineral acid transforms the dialkali metal terephthalate into the free acid which precipitates leaving the alkali metal salt of the mineral acid in solution. The alkali metal salt of the mineral acid may readily be recovered from the solution, for example by evaporation, but the alkali metal atom is attached to a mineral acid radical which does not undergo a transformation into a terephthalate by heating in an inert atmosphere and which is of reduced economic value. In other words, the above-described process is not capable of being practiced in a cyclic fashion, because the alkali metal salts of mineral acids produced in the precipitation step cannot be resubjected to the transformation reaction for conversion into a terephthalate without being first reacted with various reagents to form the alkali metal salts of the aromatic carboxylic acids useful as starting materials for said transformation reaction.

To overcome the aforesaid disadvantages, it has been proposed to acidify the aqueous solution of dialkali metal terephthalate with benzoic acid to precipitate terephthalic acid while simultaneously forming the alkali metal salt of benzoic acid which remains in solution. This method of recovering terephthalic acid has many advantages which render it attractive for commercial operation because not only is the terephthalic acid recovered but also the alkali metal is recovered as a compound which can be recycled directly to the transformation reaction. However, when an aqueous solution of a dialkali metal salt of terephthalic acid is acidified with benzoic acid, it has been found that the quantity of terephthalic acid which precipitates from the solution is not as great as that obtained by the acidification of an identical solution with a mineral acid. It is manifest from this that the reaction of benzoic acid with dialkali metal terephthalate is not a quantitative reaction.

The present invention provides an improvement which makes possible a higher recovery of terephthalic acid in the recovery of that acid from aqueous solutions of its alkali metal salts by reaction with benzoic acid.

According to the present invention, an aqueous solution of a dialkali metal terephthalate, such as is obtained in the practice of the aforesaid prior art processes, is treated with benzoic acid; the solids in the reaction mixture are then separated from the mother liquor by any convenient means, such as filtration or centrifugation, and the separated solids are then slurried in water to form a second reaction mixture and finally solids are mechanically separated from the second reaction mixture. The slurrying of the solids in water may, of course, be repeated more than once if it appears advantageous to do so. Surprisingly, the solids which are separated from the second reaction mixture have a higher acid number and contain not only a higher percentage but also a greater quantity of terephthalic acid.

The success of the process of this invention can be explained only by the fact that the reaction of benzoic acid with a dialkali metal terephthalate is an equilibrium reaction. Thus, when an aqueous solution of a dialkali metal terephthalate is acidified with benzoic acid, an equilibrium is formed between the reactants, i. e., benzoic acid and dialkali metal terephthalate, and the reaction products, i. e., terephthalate acid, alkali metal benzoate, and monoalkali metal terephthalate. This equilibrium apparently exists even though one of the reaction products, terephthalic acid, is substantially insoluble in water and precipitates from the reaction mixture. However, it has been found surprisingly that the solids which have been separated from the first reaction mixture contain not only terephthalic acid and alkali metal terephthalates but also contain substantially all of the unreacted benzoic acid despite the fact that the latter is fairly soluble in water. This indicates that the benzoic acid is probably present as an insoluble complex. On the other hand, substantially all of the alkali metal benzoate that has formed as a result of the reaction remains dissolved in the mother liquor. Alkali metal benzoate, therefore, is removed from the environment of the reaction in the first separation. When the solids from the first reaction mixture are thereafter slurried in water, further reaction takes place between the benzoic acid and alkali metal terephthalates present therein (forming an additional amount of terephthalic acid) and the solids separated from the second reaction mixture consequently contain a greater quantity of terephthalic acid than the solids separated from the first reaction mixture. One or more additional reslurryings in water may be desirable to further increase the yield of terephthalic acid.

In the process of the invention, the temperature of the reaction mixture which is formed when the solids from the first reaction mixture (or any subsequent reaction mixture) are slurried in water can be quite widely varied and temperatures ranging from the freezing point of the reaction mixture up to the critical temperature of water are permissible. There is a special advantage, however, in carrying out the reactions at a temperature in excess of about 100° C. because this results in a slurry which is much more easily filtered or centrifuged than a similar slurry formed by reaction at a lower temperature.

The process of the invention is illustrated in the following examples which are in no way intended to limit the invention. Parts and percentages in the examples, as well as elsewhere in the specification, are by weight unless otherwise specified.

Example 1

Into a reaction vessel which contained 100 parts of water, there was charged 6.73 parts of benzoic acid and 6.67 parts of dipotassium terephthalate. The resulting mixture was refluxed for 1½ hours and then cooled to room temperature. It was allowed to remain at room temperature for approximately 45 minutes and then filtered. The filter cake was next subjected to a displacement wash with 2 volumes of cold water. The wet filter cake was next slurried in 50 parts of water following which the resultant slurry was refluxed for 1¼ hours, cooled to room temperature, allowed to remain at room temperature for about 45 minutes and filtered. The final filter cake was next given a displacement wash with 2 volumes of cold water and then dried at 50° C. at a pressure of 25 mm. of mercury for 18–22 hours. Analysis of the dried filter cake gave the following data:

| Parts | Acid Number | Percent Terephthalic Acid | Percent Conversion to Terephthalic Acid |
|---|---|---|---|
| 4.10 | 666 | 99 | 89 |

To show the effect of the slurrying in water of the solids from the first reaction mixture, a small portion of the first filter cake was dried and analyzed. It was found to have an acid number of approximately 400 and comprised approximately 55% terephthalic acid and 12% benzoic acid with the remainder being potassium terephthalates. It was estimated that the amount of dry solids in the first filter cake was approximately 6.5 parts. From this data, the increase in the amount, as well as percentage, of terephthalic acid as a result of the process of the invention is apparent.

Example 2

This example was carried out in essentially the same manner as Example 1 except that in this case there was employed, as starting material, 100 parts of an aqueous solution of dipotassium terephthalate which had been obtained by heating potassium benzoate, admixed with 2.4% of cadmium chloride, to a temperature of 440° C. under 200 p. s. i. g. carbon dioxide pressure for one hour to give a solid reaction product which was extracted with water. The aqueous solution contained 7.54 parts of solids estimated to be 87% dipotassium terephthalate, the remaining solids consisting essentially of potassium benzoate and potassium carbonate.

To the aqueous solution there was added 7.3 parts of benzoic acid and the procedure of Example 1, in which the solids from the first reaction were slurried in 50 parts of water, was thereafter followed to give a final dry product analyzing as follows:

| Parts | Acid Number | Percent Terephthalic Acid | Percent Conversion to Terephthalic Acid |
|---|---|---|---|
| 4.05 | 662 | 98 | 87 |

Analysis of the solids separated from the first reaction mixture in this example gave an acid number of 385 and by calculation it was determined that the amount of dry solids separated from the first slurry was approximately 6.7 parts. The increase in terephthalic acid is thereby apparent.

Example 3

There was added to 500 parts of water, 50 parts of a reaction product obtained by heating potassium benzoate under the conditions prescribed in Example 2. This mixture was agitated for 2 hours and then filtered, the filtrate comprising an aqueous solution of dipotassium terephthalate to be used as a starting material in this example. The aqueous solution amounted to approximately 538 parts and contained 46.6 parts of solids of which dipotassium terephthalate comprised approximately 88% with the remaining solids being potassium benzoate and potassium carbonate.

To the above aqueous solution there was added benzoic acid in an amount equivalent to approximately 2 moles of benzoic acid per mole of dipotassium terephthalate and the mixture was heated to reflux and held at that point for 1 hour. It was then cooled to 25° C. over a period of about 1½ hours and then held at 25° C. for an additional hour. The resulting reaction mixture was filtered and the filter cake was given a cold displacement wash with 1 volume of cold water. The washed filter cake was then slurried in 400 parts of water and the resultant slurry was heated to reflux with agitation and then cooled to 25° C. as before. The slurry was next filtered and the resulting filter cake given a displacement wash with 1 volume of water. Again the filter cake was reslurried in 265 parts of water and the resultant slurry was heated to reflux and cooled as before. The slurry was next filtered and the filter cake so obtained was dried under vacuum. The solids were found to have an acid number of 667, indicating a terephthalic acid content of 99%, and amounted to 23.5 parts, a recovery of 83.3% of the terephthalate ion present in the initial solution.

To show the effectiveness of the process of the invention, the acid number of the final dried filter cake is compared in the following table with the calculated acid number of the feed (dipotassium terephthalate plus benzoic acid) and the acid number of the second filter cake. The acid number of the first filter cake was not determined.

| | Solids in Feed | Second Filter Cake | Third Filter Cake |
|---|---|---|---|
| Acid No. | 219 | 515 | 667 |

Example 4

An aqueous solution of dipotassium terephthalate was obtained as in Example 3. The aqueous solution amounted to approximately 538 parts and contained 47.6 parts of solids of which dipotassium terephthalate comprised approximately 77% with the remaining solids being potassium benzoate and potassium carbonate.

To the above aqueous solution of dipotassium terephthalate, there was added benzoic acid in the amount of 2 moles per each mole of dipotassium terephthalate. The resulting mixture was agitated at the prevailing water temperature (35° C.) for one hour. The resulting slurry was filtered and the filter cake washed with an equal volume of cold water. The washed filter cake was next slurried in 400 parts of water at 35° C. Again the slurry was agitated for one hour. Filtration was carried out as before and the filter cake washed with an equal volume of cold water. The slurrying in water was repeated once more and the resulting slurry was again filtered to give a final filter cake which was dried under vacuum. The acid numbers of the dry solids in the three filter cakes obtained in this example were as follows:

| | Acid No. |
|---|---|
| First filter cake | 200 |
| Second filter cake | 470 |
| Third filter cake | 668 |

It is easily seen that the percentage of terephthalic acid rose appreciable with each slurrying in water. The acid number of the final product shows that it was approximately 99% terephthalic acid. Since the final product amounted to 21 parts, this connotes the presence of 84% of the terephthalate ion present in the starting solution.

*Example 5*

In this example there was employed as starting material 100 parts of an aqueous solution of dipotassium terephthalate which has been formed by heating potassium benzoate admixed with cadmium benzoate to an elevated temperature and pressure in an atmosphere of carbon dioxide to give a solid reaction product which was extracted with water and filtered. The aqueous solution contained 15% total solids of which solids dipotassium terephthalate comprised approximately 76.25%, potassium benzoate comprised approximately 12.25%, and potassium carbonate comprised approximately 11.5%.

A stoichiometric quantity of benzoic acid was added to the aqueous solution and the resulting solution was heated to 140° C. under autogenous pressure and held at this temperature for one hour. The reaction mixture was then cooled to 35° C. and additional water was added to lower the temperature to 25° C. and to reduce the total solids content to 21%. The resulting slurry although relatively thick was readily pumpable and filterable. Employing a vacuum rotary drum filter, a filtration rate of 5.2 pounds dry cake/hour/square foot was obtained. The cake had an acid number of 338.

This first filter cake was divided into equal portions and each processed separately under different conditions. The first portion was slurried in sufficient water to provide a total solids content of 10.2% and the resulting slurry heated to 140° C. under autogenous pressure and held for one hour and then cooled to about 35° C. The resulting slurry was then filtered in the same filter as before and under the same conditions at a filtration rate of 3.6 pounds dry cake/hour/square foot. The cake had an acid number of 536. The latter cake was reslurried in water to a solids concentration of 5.8%, held at 140° C. for one hour, and then cooled to about 35° C. The resulting slurry was then filtered in the same filter as before and under the same conditions at a filtration rate of 15.2 pounds dry cake/hour/square foot. The cake had an acid number of 617. A repetition of the slurrying in water, heating, cooling, and filtering, yielded a slurry which was filterable at a rate of 24.9 pounds dry cake/hour/square foot yielding a cake having an acid number of 664.

The second portion of the first filter cake was mixed with water to form a slurry containing 8.9% total solids which was held at room temperature for one hour. The slurry was then filtered in the same equipment but the filtration rate under the same conditions as before was only 0.9 pound dry cake/hour/square foot. The cake had an acid number of 411. The latter filter cake was slurried in water at a total solids content of 8.8% and held at room temperature for one hour. The resulting slurry was filterable under the same conditions at a rate of only one pound dry cake/hour/square foot. The cake had an acid number of 495.

From the above comparison, the beneficial effect, i. e., improved filterability, resulting from heating to a temperature of 140° C. during the various reactions is apparent. Experimentation has shown gradual improvement in filterability as the reaction temperature is increased with acceleration in the rate of improvement as the temperature is increased above 100° C.

The process of this invention has been illustrated in the examples by the treatment of aqueous solutions of dipotassium terephthalate. It is obvious, however, that solutions of other dialkali metal terephthalates, such as those of sodium, lithium, and rubidium, can be treated in a similar manner to provide high yields of terephthalic acid. The process of the invention is, of course, not limited to the recovery of terephthalic acid from dialkali metal terephthalates which have been obtained by the prior art methods hereinabove discussed. That is to say, alkali metal terephthalates obtained in any manner, such as by the saponification of synthetic fiber wastes, can be treated in accordance with the invention. The invention, however, is confined to the employment of benzoic acid as the ingredient to be reacted with the dialkali metal terephthalate for the reason that other acids do not behave similarly to benzoic acid. For example, strong mineral acids, such as hydrochloric acid and sulfuric acid, react substantially completely with dialkali metal terephthalates to give quantitative precipitation of terephathalic acid. On the other hand, other benzene carboxylic acids whose alkali metal salts can be converted by known procedures to dialkali metal salts of terephthalic acid behave still differently. For example, when phthalic acid is added to an aqueous solution of dialkali metal terephthalate and solids are isolated from the resulting reaction mixture, no further increase in the amount of terephthalic acid is realized by subsequent slurrying of the solids in water. Apparently, the only effect of slurrying the solids in water is to wash out any alkali metal terephthalates and unreacted phthalic acid that may be present.

The process of the invention is advantageously conducted at concentrations, with respect to water, such that not only the terephthalic acid but also any monoalkali metal terephthalate are essentially completely insoluble. For practical purposes, the initial solution of dialkali metal terephthalate preferably contains from about 1–15% of dialkali metal terephthalate. However it is also possible to employ an initial solution of dialkali metal terephthalate which is saturated but this upper limit will vary somewhat according to the particular dialkali metal terephthalate involved. With dipotassium terephthalate, for example, a practical upper limit on the concentration of the initial solution is about 15% which represents saturation at 20° C.

The amount of benzoic acid to be employed should be at least about stoichiometrically equivalent to the dialkali metal terephthalate. This means, numerically speaking, that the amount of benzoic acid should be at least equal to about 1.9 moles per each mole of dialkali metal terephthalate. On the other hand, there is no maximum limit on the amount of benzoic acid that can be employed although there is nothing to be gained by employing a large excess since a large excess of benzoic acid will complicate the recovery problem. As a practical matter, it can be said that the amount of benzoic acid should not exceed about 2.5 moles, more preferably 2.1 moles, per mole of dialkali metal terephthalate.

The reactions involved in the practice of the invention take place through a very broad temperature range. The lowest possible temperature is approximately the freezing point of water (0° C.). At the opposite extreme, the maximum temperature which can be employed is quite high and temperatures up to the critical temperature of water are permissible. There is a special advantage to be gained, however, in employing a temperature in excess of about 100° C. because reaction at this higher temperature results in mixtures that are much more easily filtered than mixtures that have been formed by reaction at a temperature lower than 100° C. At temperatures above the boiling point of the reaction mixture, of course, superatmospheric pressure is required.

The time required for the reaction to reach equilibrium is dependent on the temperature employed. For instance, at high temperatures, no holding time is required while at low temperatures it may be desirable to hold the reaction mixture for a time up to about 60 minutes before separating solids. The minimum time in any case is easily determinable.

Regardless of the temperature utilized in carrying out the reactions, it is important to separate the solids from the reaction mixtures at a relatively low temperature because at lower temperatures the equilibrium point of the reaction and the relative solubilities of the various ingredients are more favorable to the invention. For the foregoing reasons, the reaction mixtures should be at a temperature no higher than about 60° C. during the separation of solids. This means, of course, that cooling is necessary when the reaction has been carried out at a higher temperature. It is desirable in such case also to control the rate of cooling to give maximum particle size.

The solids separated from the initial reaction mixture are next slurried in water at any convenient temperature within the range previously indicated as operable for the initial step of the reaction and holding for about the same length of time. The amount of water employed for slurrying of these solids can be fairly widely varied without great influence on the process. For practical purposes it is desirable to utilize as little water as is convenient because this means the handling of a lesser volume of material and also facilitates the recovery of alkali metal benzoate from the mother liquor. The preferred amount of water ranges from about 2–20 times the dry weight of the solids because of these considerations.

As before, the resulting reaction mixture is separated as by filtration or centrifugation, at a relatively low temperature as in the first separation, to obtain a second crop of solids. These solids invariably have a higher acid number than the solids separated from the initial reaction mixture and contain a greater quantity of terephthalic acid. In some cases recovery of substantially pure terephthalic acid may be realized at this point. However, it is frequently necessary to reslurry the solids in water one or more additional times in order to obtain a final crop of solids constituting substantially pure terephthalic acid in yields ranging upward from 80%.

The various liquors which are obtained in the practice of the invention are essentially aqueous solutions of alkali metal benzoate. The alkali metal benzoate is easily recovered by known techniques of evaporation and/or drying. It may then be recycled for the manufacture of an additional quantity of dialkali metal terephthalate.

This application is a continuation-in-part of application Serial No. 607,253, filed August 31, 1956, now abandoned.

What I claim and desire to protect by Letters Patent is:

1. The process for the recovery of terephthalic acid from aqueous solutions of dialkali metal terephthalates which comprises adding to an aqueous solution of dialkali metal terephthalate, containing from about 1–15% dialkali metal terephthalate an amount of benzoic acid at least about stoichiometrically equivalent to said alkali metal terephthalate, to form an initial reaction mixture, allowing reaction between benzoic acid and dialkali metal terephthalate to take place at a temperature above 0° C. thereby forming terephthalic acid as a solid in the reaction mixture, separating solids comprising terephthalic acid, benzoic acid, and alkali metal terephthalates from said reaction mixture at a temperature not above 60° C., slurrying said solids in water above 0° C., whereby further reaction takes place between benzoic acid and alkali metal terephthalates forming an additional quantity of terephthalic acid, and separating from said slurry at a temperature not above 60° C. solids which contain a higher proportion of terephthalic acid than the solids separated from said reaction mixture.

2. The process of claim 1 in which the alkali metal is potassium.

3. A process for the recovery of terephthalic acid from aqueous solutions of dialkali metal terephthalates which comprises adding to an aqueous solution of dialkali metal terephthalate, containing from about 1–15% dialkali metal terephthalate, an amount of benzoic acid at least about stoichiometrically equivalent to said dialkali metal terephthalate, maintaining the resulting reaction mixture at a temperature in excess of about 100° C., whereby reaction between benzoic acid and dialkali metal terephthalate takes place forming terephthalic acid as a solid in the reaction mixture, separating solids comprising terephthalic acid, benzoic acid, and alkali metal terephthalates from said reaction mixture, at a temperature not above 60° C., slurrying said solids in water at a temperature above about 100° C., whereby further reaction takes place between benzoic acid and alkali metal terephthalates forming an additional quantity of terephthalic acid, and separating from said slurry solids which contain a higher proportion of terephthalic acid than the solids separated from said reaction mixture.

4. The process of claim 3 in which the alkali metal is potassium.

References Cited in the file of this patent

UNITED STATES PATENTS 2,697,723     Carlston et al.            Dec. 21, 1954

OTHER REFERENCES

Kharasch et al: Essentials of College Chemistry, pp. 198–205, D. Van Nostrand Co., Inc. (1942).

Fieser et al.: Organic Chemistry, p. 707 (1950).

UNITED STATES PATENT OFFICE
CERTIFICATE OF CORRECTION

Patent No. 2,846,468                                        August 5, 1958

Owen York, Jr.

It is hereby certified that error appears in the printed specification of the above numbered patent requiring correction and that the said Letters Patent should read as corrected below.

Column 2, line 36, for "terephthalate acid" read -- terephthalic acid --; column 5, line 8, for "appreciable" read -- appreciably --; column 8, line 6, for "to said alkali" read -- to said dialkali --.

Signed and sealed this 21st day of October 1958.

(SEAL)
Attest:

KARL H. AXLINE
Attesting Officer

ROBERT C. WATSON
Commissioner of Patents